106. COMPOSITIONS, COATING OR PLASTIC.

84

WALTER R. FORBUSH, OF BOSTON, MASSACHUSETTS.

COMPOSITION FOR BUILDING CONSTRUCTIONS.

SPECIFICATION forming part of Letters Patent No. 531,369, dated December 25, 1894.

Application filed May 2, 1893. Serial No. 472,741. (No specimens.)

*To all whom it may concern:*

Be it known that I, WALTER R. FORBUSH, of Boston, county of Suffolk, State of Massachusetts, have invented an Improvement in Composition for Building Constructions, of which the following is a description.

This invention has for its object the production of a composition which may be used in various forms for building constructions, which shall be light in weight, capable of resisting heat and pressure in a high degree, extremely durable, cheap and readily worked.

The building materials commonly used, whether natural, as stone, granite, marble, &c., or artificial, as bricks, terra-cotta, or plaster, are open to many and various objections, on account of their weight, friability, disintegration when exposed to the elements, and for other reasons, some materials possessing strength and durability, but having great weight, while others of less weight have not the requisite resistance to pressure, heat or exposure.

In the course of my experiments to make a cheap artificial composition which shall possess the greatest number of advantages with the fewest objectionable features I have discovered that diatomaceous or infusorial earth when used as a base, combined with silicate of soda in dry or gum form, and with a saline solution, or combined with soluble glass and salt, will produce such a composition, which can be molded into various forms, or which may be applied as a plaster, either for external or internal construction, the silicate of soda in either case acting as a cementing binder.

Infusorial earth, as is well known, has a very porous cellular structure, and is exceedingly light in weight for its volume, but possessing little inherent cohesive power. When, however, it is mixed with a cementing substance as a binder its weight is still far below brick or stone, volume for volume, and the mixture is porous or cellular in a high degree, while its cohesion is so increased that it is capable of resisting great pressure. By adding suitable materials thereto, the hardness can be varied in a considerable degree, and the composition is very durable, resisting heat or the action of the elements in the highest degree.

The "commercial soluble glass" may be used as the binder, or silicate of soda in dry or gum form may be used, in connection with a saline solution, and a substance which chemically combines with the mixture to harden the same may be used to give the required density, such as alum, sulphite of zinc, or iron.

The infusorial earth and the dry or gum silicate of soda are thoroughly ground and mixed one with the other, and they may be sold in that form.

If the composition is to be molded into given forms sufficient saline solution, preferably hot, is added thereto to make the mass plastic, and it is then compressed and dried. If it is to be used as plaster the plastic mass is applied in usual manner and permitted to dry in place. I prefer the hot saline solution, as the gummy silicate of soda is more readily soluble therein.

The commercial "soluble glass" is readily obtainable and comparatively cheap, and it can be reduced to the form of a gum by evaporating the water.

Equal parts of infusorial earth and "soluble glass," and from one-twelfth to one-fifteenth of one part of sodium chloride make a very useful and satisfactory composition, and I have also found that in using the silicate of soda in gum form the proportion of saline solution thereto is about four to one by weight, in such case the amount of infusorial earth being substantially equal in volume to that of the silicate of soda and solution.

When molded or used as a plaster the hereinbefore described ingredients in substantially the proportions set forth make a light, durable, and strong composition, which is not friable nor liable to fracture, and which is substantially fireproof. When exposed to heat it will not burn nor crack, and is particularly useful in the construction of fireproof buildings, and exposure to the elements has no detrimental effect thereupon.

While I have herein described proportions of the various ingredients which give most satisfactory results, I do not limit myself to such proportions exactly, as they may be varied according to circumstances without departing from my invention.

I claim—

1. The herein described composition for building construction, consisting of infusorial earth, silicate of soda, and a saline solution, substantially as described.

2. The herein described composition for building construction, consisting of infusorial earth, soluble glass, and salt, substantially as described.

In testimony whereof I have signed my name to this specification, in the presence of two subscribing witnesses.

WALTER R. FORBUSH.

Witnesses:
GEO. W. GREGORY,
JOHN C. EDWARDS.